(No Model.)
A. WINTER.
CLOTH FOLDING MACHINE.
No. 260,270. Patented June 27, 1882.
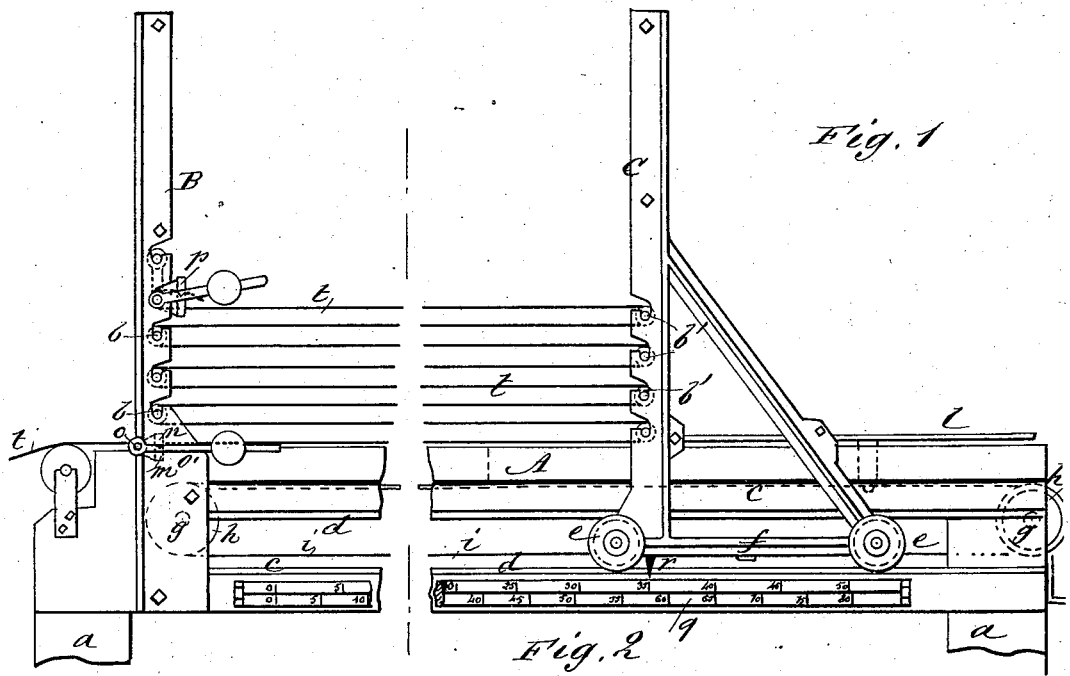
Fig. 1
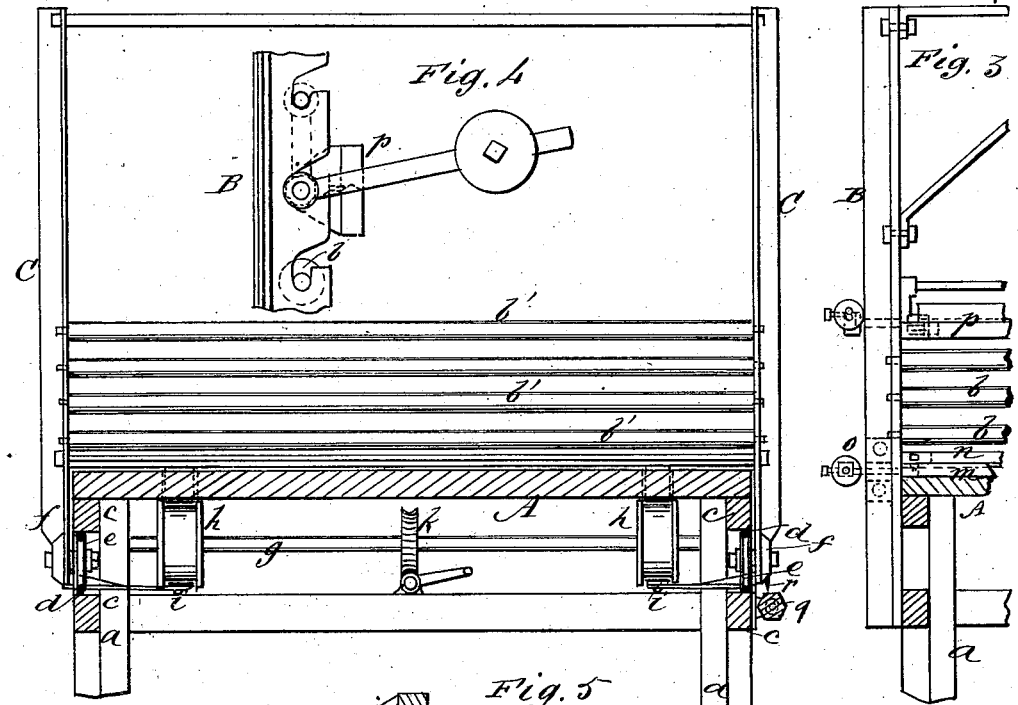
Fig. 2
Fig. 3
Fig. 4
Fig. 5
WITNESSES:
C. Neveux
C. Sedgwick
INVENTOR:
A. Winter
BY Munn & Co
ATTORNEYS.

UNITED STATES PATENT OFFICE.

ALBERT WINTER, OF PLAINFIELD, NEW JERSEY.

CLOTH-FOLDING MACHINE.

SPECIFICATION forming part of Letters Patent No. 260,270, dated June 27, 1882.

Application filed October 13, 1881. (No model.)

*To all whom it may concern:*

Be it known that I, ALBERT WINTER, of Plainfield, in the county of Union and State of New Jersey, have invented a new and useful Improvement in Cloth-Folding Machines, of which the following is a full, clear, and exact specification.

My improvements relate to machines for folding cloth into layers of equal length from a roll or pile; and the invention consists in a machine which combines a fixed and a movable frame, carrying rollers and operated for drawing the cloth into folds of the length required, as hereinafter described and claimed.

Reference is to be had to the accompanying drawings, forming part of this specification, in which similar letters of reference indicate corresponding parts in all the figures.

Figure 1 is a side elevation, contracted in length, of my improved folding-machine. Fig. 2 is a vertical transverse section of the machine, showing the movable frame. Fig. 3 is a partial cross-section, showing a portion of the fixed frame. Fig. 4 is a detail view, showing one of the clamps in larger size; and Fig. 5 is an end view, partly in section, of one of the clamps.

A is the bed or table, of suitable length, supported on legs $a$.

B B are standards fixed at one end of the table at the sides, and formed with slots that receive the journals of rollers $b$, which are of any suitable number. The legs $a$ are fitted with rails $c\ c$, on which are secured half-round or other suitably-shaped irons, $d$, that carry the grooved wheels $e$ of carriages $f\ f$. The carriages $f$ sustain standards C C, which are suitably braced and connected, the whole forming a traveling frame adapted for movement to and from the fixed standards B. The standards C are slotted to receive the journals of rollers $b'$, corresponding with those on the fixed standards.

Beneath the table A there are cross shafts $g\ g$, sustained by suitable bearings and carrying pulleys $h\ h$, around which endless chain-belts $i$ pass. There is a worm-wheel, $k$, on one shaft, $g$, engaged by a pinion driven by hand or power to give movement to belts $i$, and the belts are to be connected to a bail, $l$, that projects from the back of the carriage by a pin, $l'$, or in any other suitable manner for moving the carriage back.

On the fixed standards B, next above the table, is a clamp consisting of a fixed jaw, $m$, extending the width of the table, and a moving jaw, $n$, attached on a cross-rod, $o$, which has weighted arms $o'$ on its ends. A similar clamp, $p$, is suspended above the rollers $b$ by a cross-rod placed in the roller-slots, so that it can be readily shifted from one slot to another, according to the number of folds.

In operation, the web $t$ of cloth may come direct from a measuring-machine or from a roll or a pile, as most convenient. The frame or carriage is to be moved inward to bring the standards C close to the fixed standards, the end of the cloth passed through the lower clamp, which is open, and the cloth then placed in layers back and forth on the rollers $b\ b$. This is done by putting the rollers in place in succession until the desired number of folds or layers are formed, after which the end of the web is secured in the upper clamp, $p$. Power is then to be applied to move the standards C outward, thus lengthening the folds and drawing the cloth from the roll or pile until the end reaches the lower clamp, which is then to be closed, and the folds stretched tightly by moving the standards C outward as far as possible. The moving frame is then clamped, rollers $b\ b'$ drawn out, and the cloth drops upon the table in folds of equal length, or nearly so.

It will be understood that the folds of the cloth vary in length according to the quantity of cloth in the roll or pile, and that whatever may be the quantity the apparatus divides it equally between the folds.

I provide for an automatic indication of the total length and utilize the machine for measuring by the devices next described.

$q$ is a scale-rod attached on the side rails, $c$, and $r$ is a pointer on one carriage, $f$, extending adjacent to the upper side of the scale-rod. The rod is preferably hexagonal, and sustained in pivots, so as to be turned either side upward, and the several sides are marked and numbered, each side being gaged for a certain number of folds. For instance, for eight folds the graduations on the rule are an eighth of a yard apart, and, the carriage having moved out a yard, the pointer would indicate eight yards on the scale.

This machine is intended specially for use by clothing-manufacturers, and in their work will save labor and prevent waste of material.

The machine, as shown, is fitted for horizontal movement, but may be arranged with a vertically-sliding carriage, if preferred.

Having thus described my invention, I claim as new and desire to secure by Letters Patent—

1. The combination, with table A and fixed standards B, carrying rollers $b$, of the movable standards C, carrying rollers $b'$, substantially as shown and described, for operation as set forth.

2. The wheeled carriages $f$ and slotted standards C, combined with table A, having side tracks, $d$, and the fixed standards B, substantially as shown and described.

ALBERT WINTER.

Witnesses:
GEO. D. WALKER,
C. SEDGWICK.